US005939193A

United States Patent [19]

Katsen et al.

[11] Patent Number: 5,939,193

[45] Date of Patent: Aug. 17, 1999

[54] OVERHEAD TRANSPARENCY FOR COLOR LASER PRINTERS AND COPIERS

[75] Inventors: Boris J. Katsen, Longmeadow; John P. McCue, Holyoke; John Cavanaugh, Easthampton, all of Mass.

[73] Assignee: Rexam Graphics Inc., S. Hadley, Mass.

[21] Appl. No.: 08/363,029

[22] Filed: Dec. 23, 1994

[51] Int. Cl.[6] ........................ B32B 9/04

[52] U.S. Cl. ........................ 428/411.1; 428/195; 428/212; 428/402; 428/446; 428/480; 428/500; 428/913

[58] Field of Search ........................ 428/195, 206, 428/913, 914, 212, 402, 411.1, 446, 480, 500; 430/290, 152, 176

[56] References Cited

U.S. PATENT DOCUMENTS

| | | | |
|---|---|---|---|
| 5,198,306 | 3/1993 | Kruse | 428/481 |
| 5,202,205 | 4/1993 | Malhotra | 430/17 |
| 5,244,714 | 9/1993 | Malhotra et al. | 428/195 |
| 5,296,447 | 3/1994 | Suto et al. | 503/227 |

*Primary Examiner*—William Krynski
*Attorney, Agent, or Firm*—Burns, Doane, Swecker & Mathis, L.L.P.

[57] ABSTRACT

Provided is a transparent recording sheet useful in producing electrophotographic images for overhead projections. The recording sheet comprises a transparent polymeric base and an imaging layer. The imaging layer comprises at least one resin and at least one transparentizer in amounts sufficient to have the imaging layer exhibit a $T_g$ in the range of from about −15 to about 50° C.

21 Claims, 3 Drawing Sheets

OVERHEAD TRANSPARENCY FOR COLOR LASER PRINTERS AND COPIERS

BACKGROUND OF THE INVENTION

The present invention relates to a transparent electrostatic image transfer recording sheet. More specifically, the present invention relates to a transparent recording sheet which permits more complete image transfer and fusing of toner into the novel image layer of the recording sheet.

In recent years, color copying machines and color laser printers employing an electrostatic image transfer system have been developed. According to this system, printing is conducted in such a manner that an image is optically formed on a transfer roller, and a toner composed of colorant carrying resin particles is electrostatically adsorbed on the latent image, and the adsorbed toner is transferred to an image receiving recording sheet, followed by fixing of the image.

Advances in electrophotography have resulted in the introduction of a new generation of color laser printers and copiers. The Cannon CLC-500 copier and Tektronix Phaser 540 printer represent some of the many new entrants. Most of the applications for electrophotography are related to paper based hard copies. Paper has an intrinsic volume conductivity and a sufficient pores volume to work well in color laser devices.

However, a large portion of the hard copies made with color laser printers and copiers are also done to produce transparencies useful for overhead projectors, i.e., OHP transparencies. Such OHP transparencies are used to make presentation slides, and color slides have been found to be replacing black and white copies.

The transparency generally involves a transparent resin sheet such as a polyester sheet, e.g., polyethylene terephthalate. The fixing of the image to the transparency, however, can cause problems since it involves fusing. The image is generally fixed and the temperature range is from 140 to 195 degrees C. which requires a great deal of thermal stability on the part of the OHP transparency composite. The thermal fixing also often involves pressing, and therefore occurs at considerable pressures which may cause serious deformations in the film transparency. Problems are often observed when commercially available OHP transparencies are used to make the transparent electrophotographic images. For example, when the thermal mechanical stability of any element of a OHP transparency is poor, distortion of the film occurs in the fuser and material will not exit from the printer easily. While the transparencies of today are made of many different plastic films other then the polyesters, such as polycarbonates and cellulose derivatives, all of them are subject to triboelectrical charging. When this charge occurs in the feed tray of the printer or a copier during a single film advancing motion, the sheet behind that first copy becomes electrostatically attracted to the first one, and moves together with that first sheet. This undesirable movement is called double pick-up or a mispick, which can seriously effect the transport reliability of the material in the system working in the unattended mode, i.e., in the absence of an operator.

In the fusing station there is an application of silicon oil which is needed to prevent an image transfer from the OHP transparency onto the fixing roller. Most of the commercial OHP transparencies show a large amount of silicon oil on the surface of the finished copy.

As discussed above, polyester films are often used as a carrier in today's OHP transparencies. The imaging layer of most commercially available transparencies consist of either acrylic of fully esterified epoxy resins, often mixed with quaternary ammonium ionically conductive polymers. Such systems generally have a glass transition point of from 55 to 75 degrees C. A back side coating is almost invariably an acrylic resin, which contains polymeric quarternized ionic conductors and spacer particles formed by large 5 to 10 microns polymeric beads, made from urea-formaldehyde or acrylic resins.

It has been found that such ionically conductive compounds have a tendency to migrate to the surface and create a condition where the surface resistivity drops below $10^{10}$ ohms/sq which causes an incomplete charging of the backside due to the fast charge dissipation. This phenomenon causes toner dropouts, which result in image defects. Quaternary polymers can also aggregate during the migration process and interfere with light transmission as well as with completeness of the fusing process. All of these effects result in an incomplete image transfer, poor fusion of the toner and sharp changes in refractive indexes along any direction in the imaged areas. During projection, these defects are seen as dark bands (incomplete fusing) or white spots (incomplete toner transfer).

Commercial designs of the OHP transparencies have also been found to exhibit many other undesirable deficiencies. For example, commercial designs are generally incapable of producing an image with a relatively low haze value. Another disadvantage of existing commercial materials is a propensity to absorb significant amounts of the silicon oil applied during the fixing process, which can also result in poor imaging as the oil interferes with the fusion process. When an incomplete or poor fusion occurs, the toner particles are not connected and there is a lot of light scattering from the edges of the individual toners, resulting in light escaping the collimating lens of the projector and showing muddy color with poor image definition.

There is a need in the industry therefore to provide an OHP transparency which forms highly defined good quality projectable images. A projected image is good when the haze of the image is low and sharp images are projected. Furthermore, it is important that reliable transport properties are exhibited by the OHP transparency in the printer. The OHP transparency is reliable when only a single sheet is transported during an individual imaging cycle. The conventional approach utilizing the above-mentioned components of the imaging layer and components of the chargeable layer do not satisfy these requirements.

Accordingly, it is an object of the present invention to provide an OHP transparency for color laser printers and copiers which overcome all of the aforediscussed deficiencies.

In another embodiment of the present invention, there is provided a novel overhead transparency which permits complete transfer of the toner with complete fusion of the toner.

In yet another object of the present invention, there is provided an overhead transparency which exhibits reliable behavior in the printer such that a single sheet is transported at any one time.

These and other objects of the present invention will become apparent upon a review of the following specification and the claims appended thereto.

SUMMARY OF THE INVENTION

In accordance with the foregoing objectives, the present invention provides an overhead transparency which is comprised of a transparent polymeric carrier and an imaging layer. The imaging layer comprises at least one resin and at least one transparentizer. The transparentizer is preferably a polyether or polyester, and is most preferably polyethylene glycol. The transparentizer aids in achieving complete fusion of the toner in a minimal amount of time. The resin and the transparentizer are combined to provide a composite imaging layer which preferably exhibits a $T_g$ of from −15 to +50 degrees C.

In a preferred embodiment, the imaging layer of the transparency comprises a combination of a phenoxy resin and a polycaprolactone resin, in combination with a polyether, such as polyethylene glycol or polypropylene glycol.

In yet another preferred embodiment, the overhead transparency comprises a charge acceptance layer on the side opposite the imaging layer, where the charge acceptance layer comprises a high $T_g$ resin, e.g., $T_g$ at least 20° C., together with a large amount of colloidal silica, e.g., up to 30 weight percent colloidal silica based upon the weight of the resin. Preferably, the high $T_g$ resin is a styrenated acrylic resin, or a phenoxy resin.

DETAILED DESCRIPTION OF THE PREFERRED EMBODIMENTS

Figure 1:
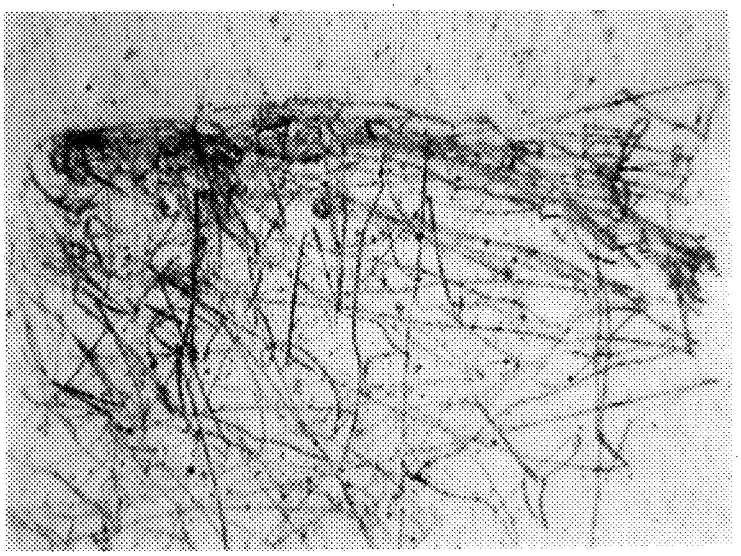
FIG. 1 is a magnified photograph of the scuffing caused by a backside coating not containing amorphous colloidal silica.

By the present invention, a unique combination of materials for use in the imaging layer of an overhead transparency has been found. The imaging layer of the transparency of the present invention comprises a combination of at least one resin and at least one transparentizer, with the $T_g$ of the resin and the amount of transparentizer being sufficient to provide a composite imaging layer which exhibits a $T_g$ of from −15 to 50° C. Preferably, the imaging layer exhibits a $T_g$ in the range of from about −5.5 to about 20° C. This relatively low $T_g$ is important because it allows the imaging layer to complete fusion of the toner in a minimal amount of time.

Preferably, the resin in the imaging layer comprises a film forming resin which is a good dielectric compound. A preferred resin could be a phenoxy resin, e.g., having a $T_g$ in the range of from 95–103° C.

A resin can be employed which plays the role of a film former and a transparentizer. A polycaprolactone resin is suitable as a transparentizer and exhibits film forming abilities. It is most preferred to use a phenoxy resin and a polycaprolactone resin in combination. The high $T_g$ phenoxy resin and the low $T_g$ polycaprolactone resin are compatible and are used in a compatible ratio so as to provide an overall imaging layer with the requisite relatively low $T_g$.

At least one transparentizing agent is present. The transparentizer can be a solid or liquid. It is preferred, however, that the transparentizer be a liquid such as a polyether or a polyester, and is preferably a polyether such as polyethylene glycol or polypropylene glycol. A polyester such as esterified tall oil, corn and soya bean oil can also be used.

The transparentizer is a compound which effects a reduction in light scattering and thereby results in a low level of haze. The resulting projectable image is of extremely high quality. This is achieved by the transparentizer assisting in a complete fusion of the toner. By complete is meant that substantially all of the toner is fused and it is fused so as to form a continuous phase, i.e., a film relatively without interruption. Due to the continuous phase coating created, there are no large edges of toner to scatter light, which creates a muddy color projection.

The haze value of the images achieved by the overhead transparency of the present invention has been measured using a Gardner haze meter and conventional measuring procedures to be as low as 9–12% in the imaged areas. With the haze values in the unimaged areas being from 4 to 8 percent, such a relatively low haze value results in excellent viewing characteristics of the images made according to the present invention.

The most preferred transparentizing agent is a polyethylene glycol, which is commercially available. One commercially available polyethylene glycol which is of particular preference is PEG-400, available from Aldridge Corporation. However, polypropylene glycol, esterified tall oil or corn and soya bean oil are examples of other suitable transparentizing agents. Resins, such as polycaprolactone, can also perform the role of a transparentizing agent.

The resin and the transparentizing agent are used in combination so as to provide an overall imaging layer exhibiting a glass transition point for the imaging layer in the range of from −15 to 50° C. It is most preferred that the glass transition point for the imaging layer exhibited by the imaging layer be in the range of about −5.5 to about 20° C., as this is the range within which the best images have been obtained.

In a most preferred embodiment, the imaging layer comprises a combination of a phenoxy resin and a polycaprolactone resin, with a polyethylene glycol also being present. It has been found that both the polyethylene glycol and the polycaprolactone resin act as transparentizers to ensure complete fusion of the toner in a minimal amount of time. Thus, with the polyethylene glycol and the polycaprolactone being incorporated into the image receiving layer, they are supplied to the toner resins when needed most, i.e., at the point of fusion. Thus, in a sense, the imaging layer serves as a reservoir for the toner resin transparentizer, which aids in the complete fusion of the toner, resulting in the excellent images.

The present invention also provides a charge accepting layer which overcomes the problems of good transport in the printer. The charge accepting layer is the coating on the back side of the overhead transparency, i.e., the side opposite that of the imaging layer. This layer comprises a high $T_g$ resin, i.e., a resin having a $T_g$ of at least 15.5, and preferably at least 20, up to 100 or greater, and most preferably at least 50 $T_g$, in combination with a large amount of colloidal silica, i.e., silica having an average particle size of less than 0.1 microns. The combination of such a high $T_g$ resin with the colloidal silica unexpectedly has been found to provide an antistatic level of surface resistivity in the range of from $10^{10}$ to about $10^{12}$ ohms/sq. It is preferred that the coating weight of the charge accepting layer be in the range of from about 0.5 to 0.7 g/sqm.

The high $T_g$ resin used in the charge accepting layer is preferably an acrylic or a phenoxy resin. The amount of colloidal silica used in combination with the resin is any amount up to 30%, with from 20 to 30 weight % being most preferred. The use of such a charge accepting layer has been found to show an improvement of antistatic properties of the transparency which is void of static charges not only during material sheeting procedures, but also in the course of overland transportation. The exclusion of such negative charges on the surface allows excellent use of positive bias potential during the image transfer step and thereby provides for flawless transportation in the printer during an actual imaging cycle.

Figure 2:
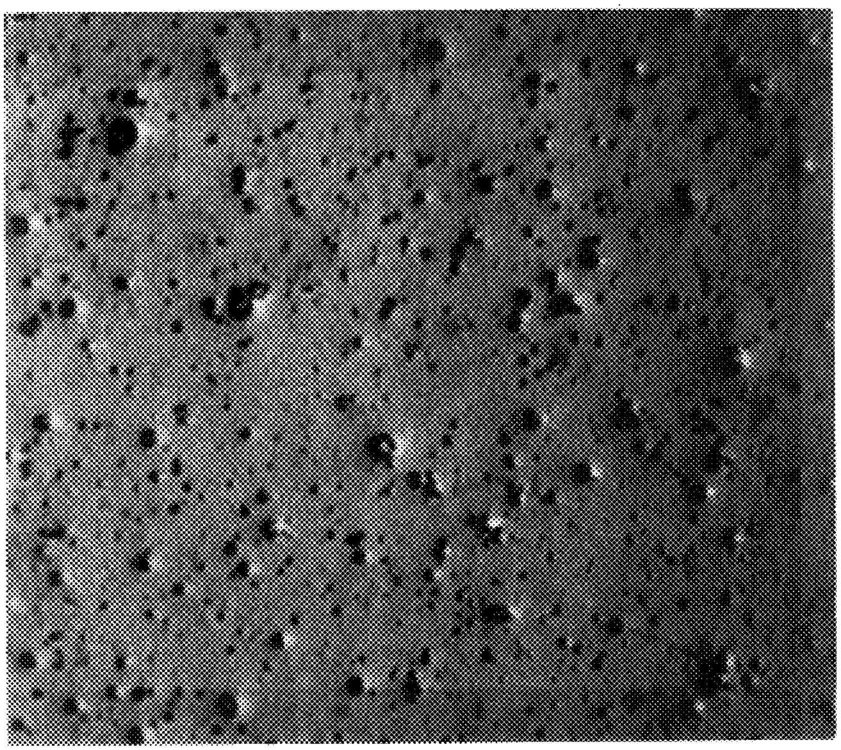
FIG. 2 is a magnified photograph of an undamaged imaging layer when colloidal silica is present in a backside coating in accordance with the present invention.

For example, FIG. 1 clearly shows the scuff marks produced in an imaging layer during transportation when no colloidal silica was used, and more traditional precipitated silica was used in the charge accepting layer. To the contrary, FIG. 2 shows the undamaged surface of an imaging layer when colloidal silica is present in the back side coating. The colloidal silica is amorphous and non-abrasive.

Therefore, the charge accepting layer of the present invention not only provides an anti-static level of surface resistivity which is quite remarkable and which overcomes many of the problems of movement or transporting in a printer, it also provides distinct advantages with regard to scuff marks produced during storage and/or transportation.

In general, it has been found that when the imaging layer is employed in combination with the charge accepting layer, the overhead transparency of the present invention can result in an image from an electrophotographic device which has excellent projection quality, does not adsorb silicon oil in any appreciable quantities and provides for good transport in the printer. Furthermore, most conventional transparencies use a paper stripe for transport and sometimes for identification purposes. In electrophotography all commercial films have a stripe. The material of the present invention does not have a need for such a stripe which makes it more desirable because an image cannot be made in the area of the stripe itself.

The invention will now be illustrated in greater detail by the following specific examples. It is understood that these examples are given by way of illustration and are not meant to limit the disclosure of the claims to follow. All percentages in the examples, and elsewhere in the specification, are by weight unless otherwise specified.

EXAMPLE 1

A phenoxy resin exhibiting a $T_g$ of 102° C. was combined in a 3:1 ratio based on dry resin weight with a polycaprolactone resin exhibiting a $T_g$ of −60° C. The mixture was dissolved in a methylethyl ketone solvent. The phenoxy resin was available as grade PKFE from Phenoxy Associates of Rock Hill, S.C. The polycaprolactone resin was available under the trademark Tone P-300 from Union Carbide. The ratio of 3:1 was a compatible ratio between the two resins such that a coating solution of a single phase was created. It is generally important that the ratio of resins used be such a compatible ratio.

The glass transition point for the mixture of resins was found to be 15.5° C.

An overhead transparency film was made by coating both sides of a polyester base with the solution of the two resins. A dry coating weight of about 0.2 to 0.4 lbs/1000 $ft^2$ or about 0.9 to 1.8 $g/m^2$ was used. The overhead transparency film was then imaged in a Cannon CLC-500 copier and on a Tektronix Phaser 540 printer, and analyzed for the presence of silicon oil. The analysis was through visual observation of the imaged overhead transparency, through touch of the overhead transparency and through observation of the projected image. FTIR spectroscopy was also used to determine whether any oil was present.

Commercially available transparent overhead projection sheets were also imaged and compared. The first sheet consisted of an imaging layer of an acrylic resin mixed with a quaternary ammonium ionically conductive polymer. The imaging layer had a glass transition point in the range of 55 to 75° C. The second sheet had an imaging layer consisting of a fully esterified epoxy resin mixed with a quaternary ammonium ionically conductive polymer. This image layer also had a glass transition point of 55 to 75° C. These two commercially available sheets were also imaged and printed as described above.

The overhead transparency comprised of the phenoxy-polycaprolactone imaging layer did not show any significant oil absorption. The two commercial samples picked up much more oil, especially in the Cannon CLC-500 unit.

EXAMPLE 2

An overhead transparency sheet was obtained in the same manner as in Example 1, with the imaging layer being comprised of a mixture of a phenoxy resin and a polycaprolactone resin. The sheet was printed on a Tektronix Phaser 540 color laser printer. The pattern consisted of ten windows (steps) of each primary color (cyan/magenta/yellow) and ten windows of each processed color (red/green/blue). On the top portion of the pattern three windows of a larger size were made by electronically mixing yellow and magenta toners to create so-called flesh tones.

The progression of toner density was such that the first window had 100% toner coverage, the second window had 90% coverage and the last, or tenth, window had 10% toner coverage. Toner coverage means total area occupied by colored substances inside of the fixed field of vision, equal to the square area of each individual window.

Area calculations, dot sizes, the shape of the dots and number of dots in each individual window were calculated using a Rexham Graphics Image Analyzer, type Niosis Vision Systems of Montreal, Canada. This system consists of a high resolution optical microscope, a motorized table, CCD camera, TV monitor, a hard disk drive and software with freeze frame capabilities, which is able to do morphological and fractal analyses, such as count the dots, characterize their shape and calculate integral areas occupied by dots and areas free of dots.

The optical density and Gardner haze of the transparency was also obtained on Niosis Vision System using a Gardner haze meter and a Macbeth 927 transmission density densitomer.

The same printing and analysis was also accomplished for the two commercial sheets described in Example 1. Commercial #1 was the sheet containing the acrylic containing imaging layer and Commercial #2 was the sheet containing the epoxy containing imaging layer.

The results of the various measurements and calculations are presented below in Table 1.

TABLE 1

| | Optical Density in Windows | | | Haze level, % | |
|---|---|---|---|---|---|
| Sample | cyan (w1/w6/w10) | magenta (w1/w6/w10) | yellow (w1/w6/w10) | flesh tone | full yellow |
| Example 1 | .96/.59/.30 | .71/.55/.04 | .44/.33/.01 | 37.5 | 15.0 |
| Commercial #1 | .95/.40/.02 | .75/.51/.04 | .44/.30/.02 | 48.0 | 20.0 |
| Commercial #2 | .93/.53/.03 | .70/.56/.04 | .47/.34/0.0 | 46.0 | 18.0 |

In the foregoing table, the higher the haze level at the flesh tone window the less clarity that is seen in the projection mode. It should be noted that for the image printed on the phenoxy-polycaprolactone imaging layer, the flesh tone window was superior. This is evidence of better fusing of the toner and better toner transfer capabilities of the imaging layer.

Figure 3:
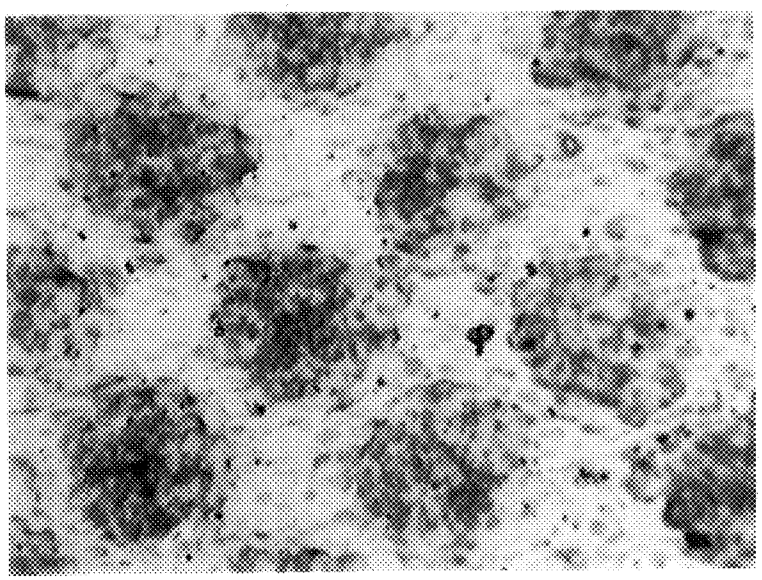
FIG. 3 is a magnified photograph of a well fused image in a flesh tone window in Example 2.

The level of silicon oil adsorption was also evaluated after printing in accordance with Example 1 and found to be moderate for the sample of the present invention and higher for the commercial samples. The well-fused image obtained in the flesh tone window for the material of the present invention is represented in FIG. 3.

EXAMPLE 3

An imaging layer coating solution was prepared using the phenoxy resin and polycaprolactone resin of Example 1 at a 3:1 ratio, and dissolving the mixture in a methylethyl ketone solvent. Sufficient methylethyl ketone was used to create a 25% solids mixture, to which 1.5% by weight of silica powder grade AN-45 available from PPG Industries and 1.5% by weight of silica powder grade G-602 available from PPG Industries were added under constant stirring. The percent of silica was calculated on the total dry weight of resins.

An overhead transparency was prepared by coating both sides of a clear polyester film base. The material was converted, sheeted and transported in boxes. When inspection of the sheets was done, multiple scuff marks was detected on the imaging layer as shown in FIG. 1.

EXAMPLE 4

An overhead transparency was prepared using the final coating solution of Example 3 to coat an imaging layer on a clear polyester film base. The back side coating, or the charge acceptance layer, was made by diluting a styrenated acrylic resin grade Joncryl 87 to 10% by weight solids with a mixture of water and ethyl alcohol. To the diluted resin solution was added colloidal silica (Nalco 2326) in a quantity of about 22% by weight based on the weight of dry resin. An insignificant amount (0.2% by weight based on the dry resin weight) of precipitated silica (KU-33 available from PPG Industries) was also introduced into the solution.

On a precision dye coater, a coating was applied to the polyester film base to the side opposite to that of the imaging layer at a coating weight of about 0.5 grams per square meter, and then dried. The sheets were converted and packaged in packs of 50 sheets and transported in boxes in a similar mode to that of Example 3. The material was inspected after delivery and found unchanged, without any scratches or scuff marks on the imaging layer, as shown in FIG. 2.

EXAMPLE 5

The overhead transparency sheet prepared in Example 4 was imaged on a Tektronix Phaser 540 printer using the pattern described in Example 2. The haze level in the window of 40% intended toner coverage was measured and compared to the haze level obtained for commercial sheet No. 2. The haze level for the overhead transparency prepared in accordance with Example 4 was 27% versus 34% for commercial sheet No. 2.

Figure 4:
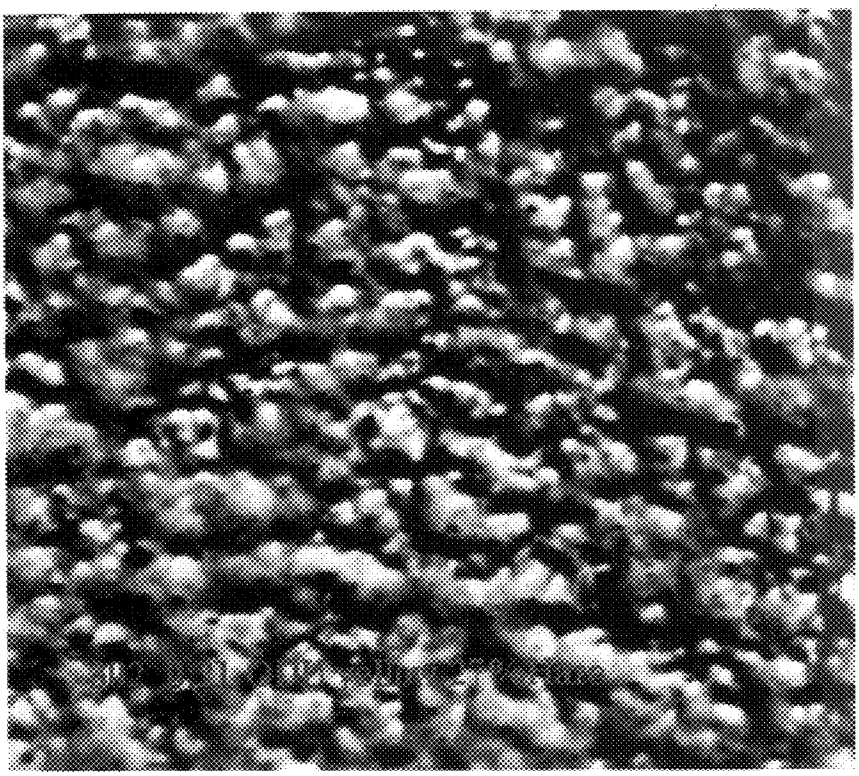
FIG. 4 is a magnified photograph of a well fused image utilizing an imaging layer in accordance with the present invention.
Figure 5:
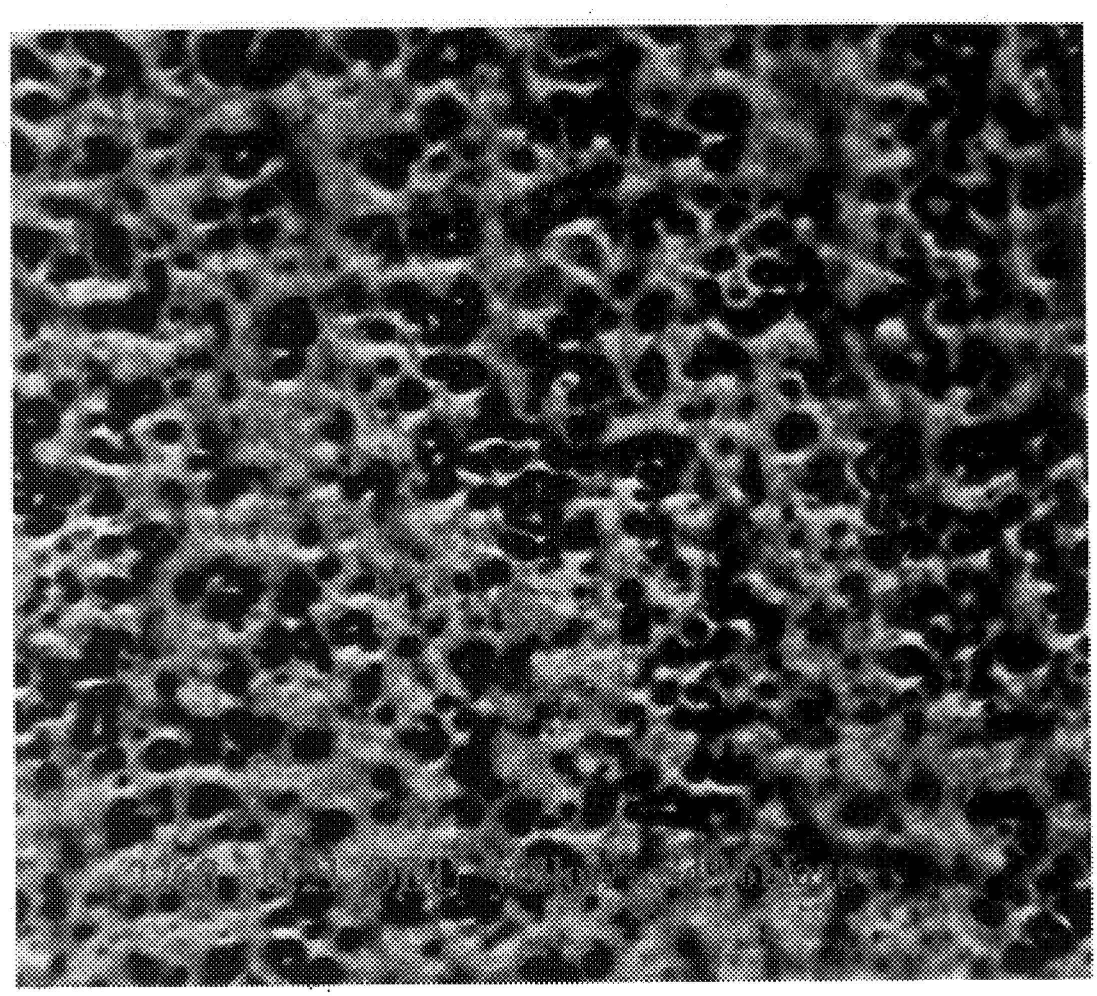
FIG. 5 is a magnified photograph of an overhead projection transparency image exhibiting an insufficient level of fusion.

A photograph of the imaged areas for the imaged sheet prepared in accordance with Example 4 is shown in FIG. 4. A photograph of the imaged area for commercial sheet No. 2 is shown in FIG. 5. It can be seen that the imaged area in FIG. 4 is much more coalesced after fusing than that in FIG. 5. This results in the much lower haze level exhibited by the overhead transparency of FIG. 4 versus that of the commercial sheet No. 2. In a protection mode, the imaged overhead transparency in FIG. 4 was much clearer and had brighter color than the more hazier imaged material of FIG. 5.

EXAMPLE 6

A backside coating was prepared as described in Example 4. The coating was applied to a polyester base by a precision dye coater at a dry coat weight of 0.5 grams per square meter and dried to obtain a backside layer.

An imaging layer coating solution was prepared as described in Example 3. The solution was then divided, to which divided solutions were added varying amounts and varying types of glycols. The percentage of glycol was calculated on the basis of the dry weight of the resin in the coating. The types of glycols added and the amounts for each specific solution are shown in Table 2 below.

Overhead projection transparencies were then made by Gravure coating various solutions on a transparent polyester base. All of the materials were then imaged on a Tektronix Phaser 540 color laser printer and imaged using the pattern described in Example 2. The haze level for each imaged sheet was measured in the window containing the flesh tone combination of the toners and the 100% coverage yellow window. The results of the haze level measurements are also shown in Table 2 below.

TABLE 2

| | | | Haze Level % | |
|---|---|---|---|---|
| Sample | Glycol % | Glycol Transparentizer | Flesh Tone Window | Yellow Window |
| Invention | 0 | none | 37.5 | 15.4 |
| Invention | 6 | PEG-400* | 35.0 | 15.0 |
| Invention | 10 | PEG-400* | 27.0 | 14.3 |
| Invention | 12 | PEG-400* | 20.0 | 12.1 |
| Invention | 14 | PEG-400* | 19.0 | 10.1 |
| Invention | 18 | PEG-400* | 18.0 | 9.0 |
| Invention | 12 | polypropylene glycol | 32.0 | 16.0 |
| Control-acrylic imaging layer mixed with quaternary ammonium polymer | n/a | n/a | 38.0 | 18.0 |

*PEG-400 is a polyethylene glycol grade available from Aldridge Corporation.

As can be seen from the foregoing table, it is preferred to employ a polyether transparentizer as part of the imaging layer composition, with the amount of polyether in the imaging layer preferably ranging from about 6 to 20 weight percent in the composition. It is most preferred that the polyether be a polyethylene glycol, and that the amount of polyethylene glycol employed be in the range of from about 10 to 18 weight percent.

EXAMPLE 7

An overhead projection transparency was prepared using the coating dispersion prepared in Example 6 employing the 10 weight percent of polyethylene glycol (PEG-400). The $T_g$ of the dried imaging layer was measured and found to be −5.5° C. The coating was applied as an imaging layer to several different carrier bases. One base was a clear polyester base, whereas another base was a clear polyester base with an antistat layer, where the imaging layer was supplied directly over the antistat layer. Each of the various transparencies made also had different backside layer compositions. Each of the carrier, imaging layer and backside layer compositions, for each sample, are noted in Table 3 below.

All of the samples run were subjected to the following tests:

Transport reliability in the printer was tested at 15° C. and 80% RH.

Transport reliability was tested at 30° C. and 65% RH.

Transport reliability was tested at 20° C. and 23% RH.

Blocking properties were checked at 42° C. in a dry oven under the weight of 1 kilogram on each of six individual sheets of the particular sample material.

To test the transport reliability, the overhead projection transparencies were loaded in batches of 50 to 80 individual sheets into a feeding tray of a color laser printer such as a Tektronix Phaser 540, and those overhead projection transparencies were printed using 300 and 600 dpi modes, with printing files randomly changed by a computer.

A frequency of mispicks was recorded, with the number of jams in the transport elements of the printer observed.

The presence of static induced charges was measured and the influence of those charges on the transport and imaging characteristics of the media were recorded.

After an evaluation of all of the above results, the thermal deformation of each sample, as well as the oil adsorption and image quality of each sample, was rated qualitatively. The results of the ratings are provided in Table 3 below.

TABLE 3

| Sample | Carrier | Imaging Layer | Backside Layer | Freq. of Mispicks | Thermal Deformation (TD) Oil Adsorption (OA) Image Quality (IQ) |
|---|---|---|---|---|---|
| 1 | clear polyester | phenoxy resin ($T_g$ 95–103° C.) Polycaprolactone resin PEG-400 | acrylic bond | high | TD-some OA-small IQ-fair |
| 2 | clear polyester | same as Sample 1 | antistat | high | TD-some OA-small IQ-good |
| 3 | polyester with antistat layer | same as Sample 1 (over the antistatic layer) | backside coating of Example 4 | none | TD-none IQ-excellent OA-small |
| 4 | Same as Sample 3 | Same as Sample 3 | Phenoxy resin ($T_g$ 95–103° C.) Polycaprolactone resin $T_g$ of layer = 15.5° C. | high | TD-none IQ-very good OA-small |
| 5 | Same as Sample 3 | Same as Sample 3 | Phenoxy resin ($T_g$ 95–103° C.) Colloidal silica $T_g$ of layer = 102° C. | none | TD-none IQ-best OA-small |
| 6 | Commercial OHP transparency sheet having an acrylic based imaging layer, with the acrylic being mixed with a quaternary ammonium conductive polymer | | | some | TD-visible IQ-fair, hazy OA-high |
| 7 | Commercial OHP transparency sheet having an esterified epoxy resin based imaging layer, with the epoxy resin being mixed with a quaternary ammonium conductive polymer | | | some | TD-some IQ-poor OA-high |

It is clear that Samples 3 and 5 (demonstrating the present invention) show excellent imaging properties and are absolutely reliable in terms of transport in the printer. These samples show no thermal deformation and 10 are most projectable when slides of various complexity are made. These two samples were also the transparencies which after conversion and transportation had the lowest static charges on the surface.

More specifically, Sample 3 did not have any charges above 50–100 negative volts and Sample 5 had charges not exceeding 200 volts. Samples 6 and 7 at low RH showed close to 1 kilovolt of charge, and demonstrated a gradient of toner transfer, with certain spots of incomplete transfer. Samples 1 and 2 showed high charges at low RH, some measurements exceeded 1 kilovolt. Sample 3 did not pass the blocking test.

While the invention has been described with preferred embodiments, it is to be understood that variations and modifications may be resorted to as will be apparent to those skilled in the art. Such variations and modifications are to be considered within the purview of the scope of the claims appended hereto.

What is claimed is:

1. A transparent recording sheet useful in producing electrophotographic images for overhead projections, comprising a transparent polymeric base and an imaging layer thereon, with the imaging layer comprising at least one resin and at least one compound, different from said resin, which effects the reduction in light scattering and facilitates complete fusion of the toner, with the compound being present in an amount sufficient to have the imaging layer exhibit a $T_g$ in the range of from about −15 to about 50° C.

2. The transparent recording sheet of claim 1, wherein the imaging layer comprises a polyether, a phenoxy resin and a polycaprolactone resin.

3. The transparent recording sheet of claim 1, wherein the compound different from said resin comprises a polyether or a polyester.

4. The transparent recording sheet of claim 1, wherein the compound different from said resin comprises a polyether.

5. The transparent recording sheet of claim 4, wherein the compound different from said resin is comprised of polyethylene glycol or polypropylene glycol.

6. The transparent recording sheet of claim 1, wherein the imaging layer exhibits a $T_g$ in the range of from about −5.5 to about 20° C.

7. The transparent recording sheet of claim 1, wherein the sheet does not have a paper stripe to aid in the movement in a printer.

8. The transparent recording sheet of claim 1, wherein the sheet further comprises a charge acceptance layer on the side of the polymer base opposite the imaging layer, which charge acceptance layer comprises a resin having a $T_g$ of at least 15.5 in combination with colloidal silica.

9. The transparent recording sheet of claim 8, wherein the high $T_g$ resin in the charge acceptance layer has a $T_g$ of 20° C. or greater.

10. The transparent recording sheet of claim 8, wherein the amount of colloidal silica in the charge accepting layer ranges up to 30% by weight of the resin.

11. The transparent recording sheet of claim 8, wherein the charge acceptance layer comprises styrenated acrylic resin.

12. The transparent recording sheet of claim 8, wherein the charge acceptance layer comprises a phenoxy resin.

13. The transparent recording sheet of claim 12, wherein the phenoxy resin exhibits a $T_g$ of from 95 to 103° C.

14. The transparent recording sheet of claim 8, wherein the surface resistivity exhibited by the charge accepting layer is in the range of from about $10^{10}$ to about $10^{12.5}$ ohms/sq.

15. The transparent recording sheet of claim 8, wherein the transparent polymeric base comprises an antistatic layer on one or both of its sides.

16. A transparent recording sheet useful in producing electrophotographic images for overhead projections, comprising a transparent polymeric base having an imaging layer on one side and a charge accepting layer on the other side of the transparent polymeric base, where the imaging layer comprises a mixture of a phenoxy resin and a polycaprolactone resin in combination with a polyether such that the imaging layer exhibits a $T_g$ in the range of from about −15 to about 50° C.; and the charge accepting layer comprises a resin exhibiting a $T_g$ of at least 20° C. and up to 30 weight percent colloidal silica based upon the weight of the resin.

17. The transparent recording sheet of claim 16, wherein the charge acceptance layer comprises a styrenated acrylic resin or a phenoxy resin.

18. The transparent recording sheet of claim 1, wherein the resin comprises a phenoxy resin and the compound different from said resin comprises a polycaprolactone resin.

19. The transparent recording sheet of claim 18, wherein the imaging layer further comprises a polyether or a polyester.

20. The transparent recording sheet of claim 1, wherein the transparent polymeric base comprises an antistatic layer coated on the side of the polymeric base opposite the imaging layer.

21. The transparent recording sheet of claim 1, wherein the transparent polymeric base comprises an antistatic layer coated on both of its sides, with the imaging layer being coated over the antistatic layer on one side.

* * * * *